US007784044B2

(12) United States Patent
Buban et al.

(10) Patent No.: US 7,784,044 B2
(45) Date of Patent: Aug. 24, 2010

(54) PATCHING OF IN-USE FUNCTIONS ON A RUNNING COMPUTER SYSTEM

(75) Inventors: Garret J. Buban, Carnation, WA (US); Paul V. Donlan, Bellevue, WA (US); Adrian Marinescu, Issaquah, WA (US); Thomas D. McGuire, Austin, TX (US); David B. Probert, Woodinville, WA (US); Hoi H. Vo, Bellevue, WA (US); Zheng Wang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 2050 days.

(21) Appl. No.: 10/307,902

(22) Filed: Dec. 2, 2002

(65) Prior Publication Data

US 2004/0107416 A1 Jun. 3, 2004

(51) Int. Cl.
*G06F 9/45* (2006.01)
(52) U.S. Cl. ...................................... 717/168
(58) Field of Classification Search .................. 717/168
See application file for complete search history.

(56) References Cited

U.S. PATENT DOCUMENTS

| | | | | |
|---|---|---|---|---|
| 5,675,803 A | * | 10/1997 | Preisler et al. | 717/131 |
| 6,434,744 B1 | * | 8/2002 | Chamberlain et al. | 717/168 |
| 6,928,536 B2 | * | 8/2005 | Duesterwald et al. | 712/226 |
| 2003/0084434 A1 | * | 5/2003 | Ren | 717/172 |
| 2004/0003266 A1 | * | 1/2004 | Moshir et al. | 713/191 |
| 2004/0255284 A1 | * | 12/2004 | Kobayashi | 717/151 |

OTHER PUBLICATIONS

Fryer, K., Microsoft Press Computer Dictionary, 1997, Microsoft Press, Third Ed., p. 37, 165.*

* cited by examiner

*Primary Examiner*—John Chavis

(57) ABSTRACT

A system and method for automatically updating software components on a running computer system without requiring any interruption of service. A software module is hotpatched by loading a patch into memory and modifying an instruction in the original module to jump to the patch. A coldpatching technique places a coldpatch version of the module on disk for subsequent loading by processes, after hotpatching occurred. The coldpatch has the entry points to its functions at the same relative locations within the module as the hotpatch, which facilitates subsequent hotpatching. A hotpatch and coldpatch are automatically generated by deriving differences between changed and original binary files, and establishing the point to insert the jump. Validation is performed to ensure that the hotpatch is applied to the correct version, and that the coldpatch is replacing the correct version. Version management is also provided to control the number of patches via support rules.

33 Claims, 11 Drawing Sheets

PATCHING OF IN-USE FUNCTIONS ON A RUNNING COMPUTER SYSTEM

FIELD OF THE INVENTION

The invention relates generally to computer systems, and more particularly to modifying code executing on a computer system.

BACKGROUND OF THE INVENTION

Contemporary operating systems include a number of components, such as in the form of dynamic link libraries, or DLLS, which are loaded to provide functions to applications, other operating system components, and other code such as services and drivers. As a result of security issues and other bugs being discovered, these components need to be updated from time to time.

Developers of operating systems thus occasionally release security and other fixes to a core system component, which on any given computer is essentially always available for use by services that may enter and leave the core component code routine asynchronously relative to any update. Since the component code is in use, this component cannot be replaced without requiring a reboot, or some locking mechanism that prevents the code from being used while it is updated, but significantly lowers performance. For example, even if an installer is able to replace the component using a replacement mechanism having very little delay, the service which is using the component will not get the fix until reboot. As a result, to install the security fix, which may be critical to secure the computer, the system requires rebooting, which means a loss of service for a customer.

As another example, a network administrator may wish to patch components throughout the network that have been threatened by a virus. However, the patched code will not begin running on a system until each patched system is rebooted, causing a substantial amount of system downtime in the network, leading to customer inconvenience and loss of revenue.

Thus, updating software components on customer systems typically requires a reboot, because updates replace components at the file level (e.g. DLLs or EXEs), and these components may be in use by long running applications or services. This is because replacing components while they are in use cannot be performed safely, as a result of addresses stored within running code becoming invalid when the replacement is loaded. Similarly, a reboot is performed to patch other components that are only loaded at boot, such as kernel components, the hardware abstraction layer (HAL), and boot drivers.

Solutions to this booting problem exist, but require a component to be totally unloaded, patched, and then reloaded. One way to do this is by killing any processes that use the component, apply the patch and restart the processes. These solutions are also undesirable to customers, as like rebooting, they lead to loss of service and revenue. Many customers choose to not deploy patches for this reason, instead risking exposure to the security threats and/or bugs that the patch has been developed to fix.

For some standalone services, shutting down the applications and services that use a component that is targeted to be patched causes the component to be unloaded, whereby the patch may be safely applied. This technique does not work with many types of components, however, (e.g., services running in a service host, or SvcHost process), because these types of components are not necessarily unloaded when an individual application or service is shutdown. Moreover, having key services become even temporarily unavailable when they are expected to be present may cascade failures throughout a system or network.

What is needed is a safe and comprehensive solution to updating software components on computer systems that significantly reduces the number of reboots or other service interruptions on those customer machines, and in such a way as to not disrupt current running services or cause data loss. When reboots are not needed, customers are more likely to apply security and other fixes quickly, e.g., as they are released.

SUMMARY OF THE INVENTION

Briefly, the present invention provides a system and method for updating software components on a running computer system without requiring any interruption of service. To this end, a software component is hotpatched, with a new version of a routine loaded into memory and an instruction in the original routine changed to jump to the new patch routine. The last instruction of the patch routine returns the flow of execution back to the appropriate point, e.g., to the caller of the original function. After hotpatching, subsequent execution of the routine by calling applications or other code causes a jump to the patch code, while applications that were in the middle of a call to the routine, before the patch was applied, continue executing as if the patch was not made. To provide hotpatching, an installer loads a binary image of the patch to apply to a routine, identifies the appropriate component and routine to which the patch is to be applied, and changes the targeted routine to jump to the patched version.

Hotpatching in-process routines works with existing processes, but is not sufficient for processes that will load the patched routines in the future. Various ways are provided with the present invention to ensure that a binary file containing the patch is available for subsequent calls to load the software component, for use prior to rebooting the system, including via coldpatching. A coldpatch is similar to the hotpatch, except that the patch is applied to the binary image of the disk component, rather than in memory. The coldpatch routine includes the same code as its counterpart hotpatched routine, and is loaded (in place of the unpatched image) for future processes, and/or when a hotpatched component is unloaded and reloaded by a process. Note that hotpatching and coldpatching works for processes loading routines in libraries, and also applies to the kernel loading routines in drivers. Coldpatch files may be signed and verified to assure safe, secure application.

In one implementation, the present invention uses core API's which exist within the operating system (e.g., Windows® .NET server 2003) and enable the successful installation of a hotpatch and coldpatch in support of a security or other fix. This technique does not induce downtime, data loss, or temporary interruption of services for the customer.

To create a hotpatch and coldpatch, the changed binary and the original binary may be compared by a tool that derives their differences and establishes a point (e.g., an instruction of appropriate size, such as five bytes or greater in length on an Intel x86 CPU) in the old or preexisting routine to insert a jump out of the affected function. In other words, creating a hotpatch or coldpatch is a process of comparing the existing binary with the modified binary to determine the different instructions and establish a point within the original binary to apply or replace with a jump instruction pointing to the new function. The new code can reside anywhere within the original process space, or, in other implementations, can be shared with other processes, including with code in the corresponding coldpatch. If the space available to the existing component (e.g. DLL or driver) is exceeded, the new code may need to be dynamically relocated to a different base address (rebased) in memory.

On subsequent process starts, e.g., where loadlibrary attempts to load the affected DLL, the coldpatch version is loaded instead of the original DLL. A coldpatch is organized to be binary-wise similar to what the existing component looks like after hotpatching, with the entry points to functions at the same relative locations within the module, which allows a later hotpatch version to be used both to fix the coldpatch and to fix the running instance of a module that was previously hotpatched. Coldpatching applies for the versions of an affected binary that may be deployed in the installed space. Other mechanisms for loading a patched library instead of an existing library, including one that essentially builds a coldpatch dynamically based on the hotpatch and the existing routine, alternatively may be implemented.

Validation is performed in numerous situations to ensure that the hotpatch is applied to the correct version, and that the coldpatch is replacing the correct version with a coldpatch version that is appropriate for use in the system. If an affected component cannot pass the various validation check or checks for hotpatching and coldpatching, then the installation process takes other action. For example, if hotpatch validation fails, the coldpatch is used, e.g., by filling a pending file rename operation queue with the coldpatch filename, which will then become active upon the next reboot. If the disk swap fails or validation determines that the coldpatch cannot be used for versioning reasons, the pending file rename operation queue is filled with the filename of a full version of the updated component instead of the coldpatch, which will become active upon the next reboot. The installer may be set to automatically reboot, or may notify an administrator of the problem to decide whether to reboot or continue operating as before, with no new patch applied. In another implementation, the installer may use transactional changes to the system to ensure that related components are updated in an "all-or-none" manner, rather than as individual changes to each module.

Version management also may be provided, to control the patches via support rules that limit the number of supported branches and patches in those branches. Version management also ensures that patch installation progresses forward in time, and that patching does not regress to previous versions.

Other advantages will become apparent from the following detailed description when taken in conjunction with the drawings, in which:

DETAILED DESCRIPTION

Exemplary Operating Environment

Figure 1:
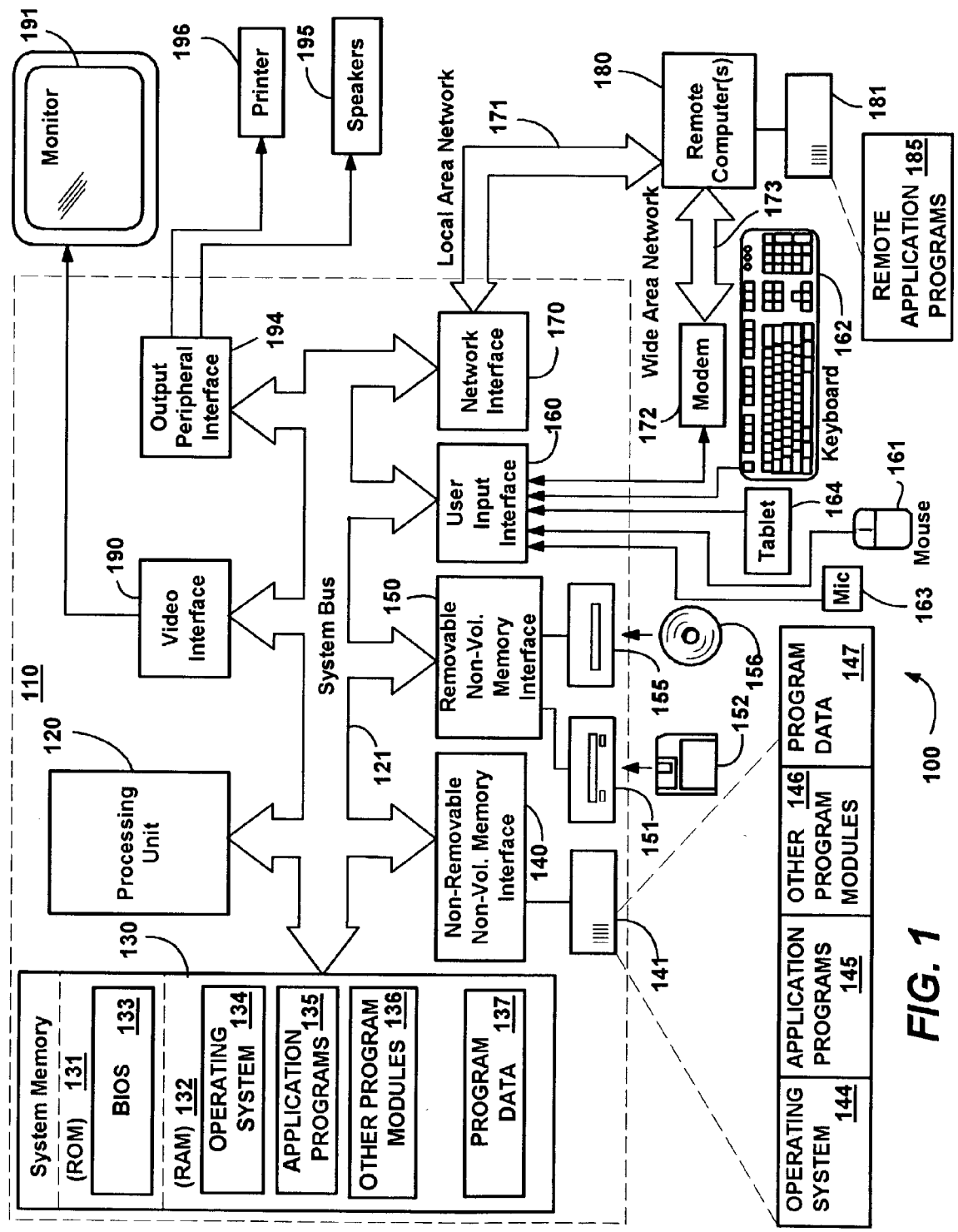
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer system 110 may comprise source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Patching and Patch Generation

One aspect of the present invention is, in part, generally directed towards applying a change to a running system without requiring any interruption of service. To this end, the present invention provides a comprehensive patching solution employing techniques including hotpatching and coldpatching. In general, hotpatching comprises the binary replacement of functions in memory, while coldpatching comprises the binary replacement of functions on disk for use when loading patched software code after patching. More particularly, hotpatching essentially comprises replacing a routine within an actively running component with a recompiled version of that routine. As described below, this method of patching components does not require the component to restart before the patch becomes active, and it does not require cooperation from the component in the patching process. Coldpatching essentially comprises updating a binary image file obtained from the original component, and inserting the hotpatchable fixes into it on the disk (or similar storage device). The coldpatch is identical to the original image plus the hotpatch (or patches) applied at runtime, with the new code residing in the same file as the original code. Note that as described below, the coldpatch is used when a component is loaded onto a running system.

Not all code changes can be installed via a hotpatch, at least not safely or easily. For example, fixes that affect multiple functions and cannot be broken up into independent changes, and fixes that cannot be run while unpatched versions of the code are running, cannot be applied with hotpatching. In other words, to be safely applied as a hotpatch, a particular fix needs to be able to be broken into independent changes, each affecting a single routine, and the system has to function correctly even if some threads execute an unpatched routine after another thread executes the patched version. Typically, hotpatching may be employed when the actual source-level change being applied to an image to be patched is relatively small, and limited to a single function (e.g., adding a parameter check, handling a special case, fixing a leak, and so forth), thereby not creating unintended side effects. Note that these constraints are based on an implementation of hotpatching, namely that a new version of a routine is loaded into memory, and the existing routine is atomically patched to jump to the new routine. There is no general way to synchronize threads with hotpatching, so one thread may be interrupted in the old routine right after the patch, while another passes through the patch point and executes the new code without interruption. Eventually the interrupted thread may resume and execute the old version of the code. Currently, there is no way to guarantee that a process and/or thread will not resume execution within a module, (e.g., due to interrupts, exceptions and so forth saving instruction pointers for later reuse); however if an architecture can guarantee that no portion of the old code can be re-executed, then this constraint could be eliminated and more types of code could be safely hotpatched. Thus, in general, the present invention may operate in virtually any manner that ensures that concurrent and subsequent execution of a patched instruction (or instructions) is logically safe. For brevity, "atomic" is described herein as one mechanism to achieve this safe operation, and is considered equivalent to any other mechanisms that can safely redirect the execution to the new code. For example, if the patching mechanism can determine that no threads are executing in the target process, this will be considered as equivalent to an "atomic" insertion of the change, even though this may not be considered as technically "atomic" in another, more traditional sense.

Thus, when confronted with a problem, upon determining a fix, a developer needs to determine whether the fix can be applied in a hotpatch. If so, the developer decides which versions the fix is to support as described below, and also checks the fix into the appropriate locations, e.g., arranged as code trees. Hotpatches also need to be thoroughly tested.

Hotpatching works by allocating memory within a process to contain the patch, and then replacing an instruction in the patched code with a hook (e.g., jump or equivalent) to the patch. Note that as used herein, the term "jump" is used to refer to a change in the flow of execution or any similar branching, even though the actual mechanism may not technically be a jump instruction. Further, although in the described examples, called routines within a module are patched up to and including the routine's return instruction, it is equivalent to hotpatch fewer instructions, e.g., part of a routine can be replaced with a patch and the patch can return to a later point within the routine. Also, hotpatching is not limited to processes or user-mode libraries, but also applies to kernel-mode code, such as the kernel, the hardware abstraction layer (HAL), boot-drivers and so forth.

By way of an example of hotpatching, suppose a sequence of instructions (existing_instr1; existing_instr2; existing_instr3; existing_instr4) is to be changed to a new set of instructions, (existing_instr1; patched instructionA; existing_instr4). Hotpatching replaces existing_instr2 with a branch to the patch routine, which executes and then returns to the caller of the routine:

existing_instr1
jmp patch
existing_instr3
existing_instr4
return to caller
patch:
patched_instructionA
existing_instr4
return to caller Because of interrupts, multiple threads running on multiple processors, multi-thread switching between the patch-related code and the running code on a single processor, and so on, to safely patch running code, the instruction (existing_instr2) that gets replaced by the jump command (jmp patch) preferably is atomically updated. This means that the replaced instruction (e.g., existing_instr2) may need to be completely contained within a processor's smallest unit of atomically replaceable memory, (e.g., a 64-bit (8-byte) word on an Intel x86 processor), so that no processor that might execute the subroutine will see a partially updated version of the patched routine. Preventing execution of a subroutine that is being patched simultaneous (in time) to applying the patch eliminates this requirement, as described below.

To find a suitable instruction to replace, it may be necessary to move backwards in the existing code, e.g., into existing_instr1, and then add any such tail instructions to the beginning of the patched code, or to move forward, e.g., into existing_instr3 and then add instructions to the front of the patched instructions (e.g., patched_instructionA) to undo the instructions that were executed but should have been patched over. Note that although inefficient, code that is likely to need a hotpatch in the future may initially be programmed with future hotpatching in mind, and have special no-op instructions or meaningless jump or other instructions intentionally placed into it for this future purpose.

An alternative to patching code with a normal change-of-control-flow instruction is to patch with an instruction causing a trap into the operating system kernel, allowing the kernel trap handler to implement the jump by altering the current instruction pointer. This may be useful in circumstances where an appropriate instruction to modify could not be found.

If the routine to be replaced does not contain a suitable instruction to replace with a jump, and alternatives such as using trap instructions would cause performance problems, the callers of the routine may instead be modified to invoke the patch version directly. Because hotpatching anticipates that the existing code may continue to execute in an arbitrary number of threads after the patch code begins to be used in some threads, the instructions used to call the routine to be replaced may be able to be modified one-at-a-time. In general, any function pointer in the system (e.g. virtual function tables for C++, or function pointers maintained in arbitrary data structures) may be modified to switch from the existing routine to the patch version.

For some fixes, not all the calling functions need to be redirected to the patch version. For example, if the patch fixes a security vulnerability, only callers that would expose that vulnerability need to be modified to use the patch version that contains the fix. The existing code can continue to be used indefinitely by other paths through the code.

Further, as mentioned above, there is no way to guarantee that a process and/or thread will not resume execution anywhere within a module. This may lead to further requirements on hotpatching under certain situations. For example, if a running program has entered an event loop (and will stay there for the remainder of the program execution), and the fix is within the event loop, the hotpatch code may never get executed, since the hook for the routine may be placed somewhere above the event loop. One solution is to guarantee a hook be placed inside the loop such that the control flow will transfer to the patch version on the next iteration. This may require that the hook jumps into the middle of the loop in the patch version, or that extra code is emitted in the patch to undo the extra instructions before the hook in the existing version.

Figure 2:
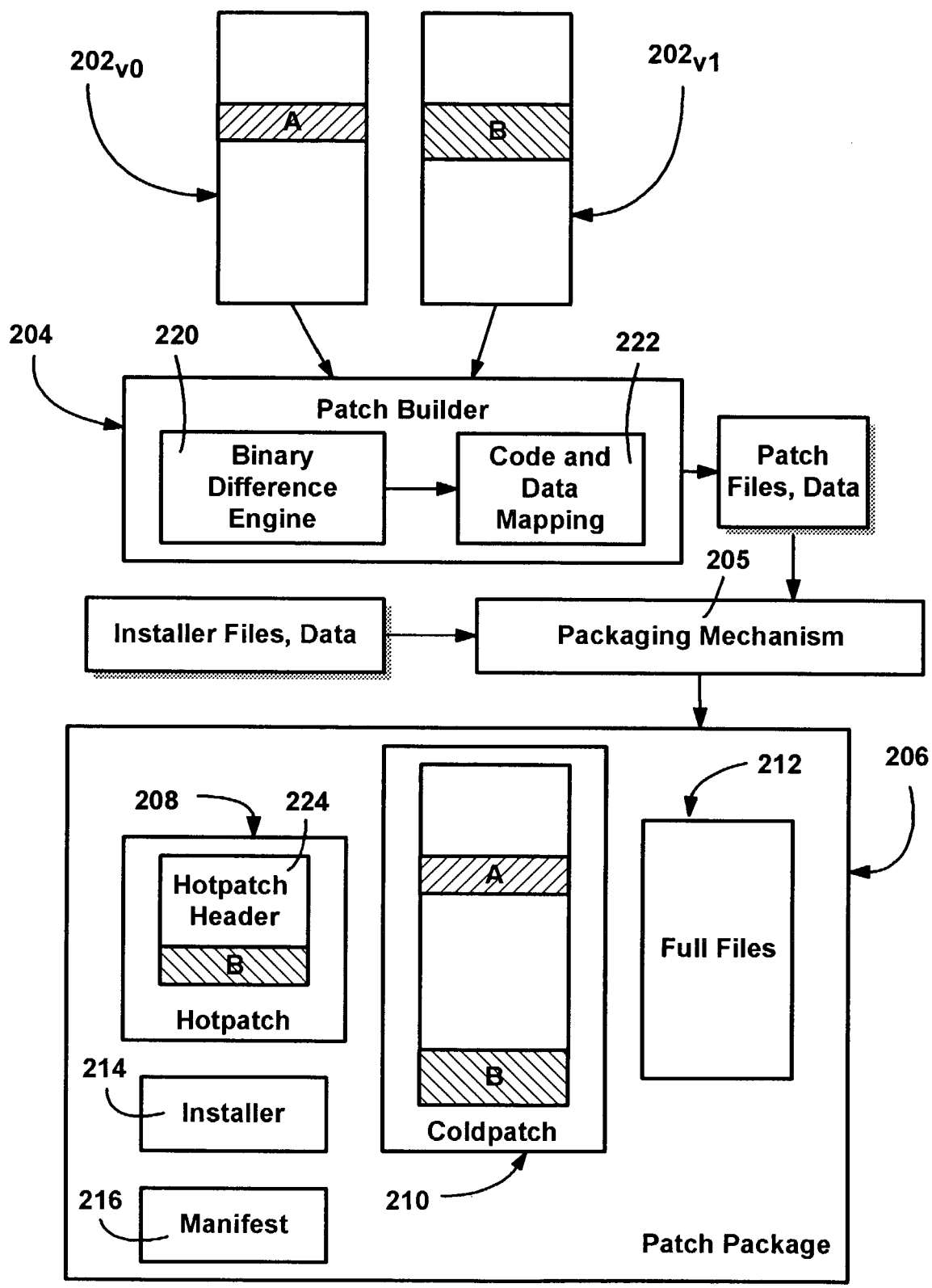
FIGS. 2 and 3 are block diagrams generally representing the construction of a patch package as patches are generated, in accordance with an aspect of the present invention.

FIG. 2 represents one way in which a hotpatch may be produced for later applying to a running code, and at the same time, how a coldpatch may be generated for later execution. In FIG. 2, a file $202_{v0}$ to be patched (a target file) contains code including a routine labeled A. Note that multiple hotpatchable fixes may be present in a single hotpatch/coldpatch, (e.g., a Routine A and C can be patched in the same hotpatch and coldpatch) as long as each routine that is patched meets the rules for patching, however for purposes of this example, the patching of routine A will be described as taking place at one time, with another routine, Routine C, described with reference to FIG. 3 as taking place later in time.

Routine A is to be patched with routine B, which is present in the new file $202_{v1}$ that, for example, is a recompiled new file version which fixes a security problem. In keeping with the present invention, the new file $202_{v1}$ may be used following a reboot to achieve the same results as the hotpatch, coldpatch combination described below, however one purpose of the present invention is to avoid having to cause a reboot.

The two files $202_{v0}$ and $202_{v1}$ are input into a patch builder 204, which is a tool that in conjunction with a packaging mechanism 205 generates a patch package 206 that can be applied to a system. The package 206 contains a hotpatch 208 and a coldpatch 210. As described below, the package 206 may contain other versions of hotpatches and coldpatches, but for purposes of simplifying this example, it is assumed that these are the first hotpatch and coldpatch versions that have been generated.

In one implementation, coldpatches have been implemented in conjunction with hotpatches in an effort to reduce the number of code configurations to which a hotpatch would have to be applied, which generally facilitates patch chaining. When a subsequent hotpatch is applied, a single version can be used with the various processes on a system. Processes that started after the last hotpatch will be using a version of the component that looks as if it had previously been hotpatched, rather than recompiled. Even in some cases where hotpatching could not be performed, e.g. because multiple routines must be atomically updated, the coldpatch technology may be used to produce the new version of the file, reducing the number of hotpatch versions required for future fixes.

Figure 5:
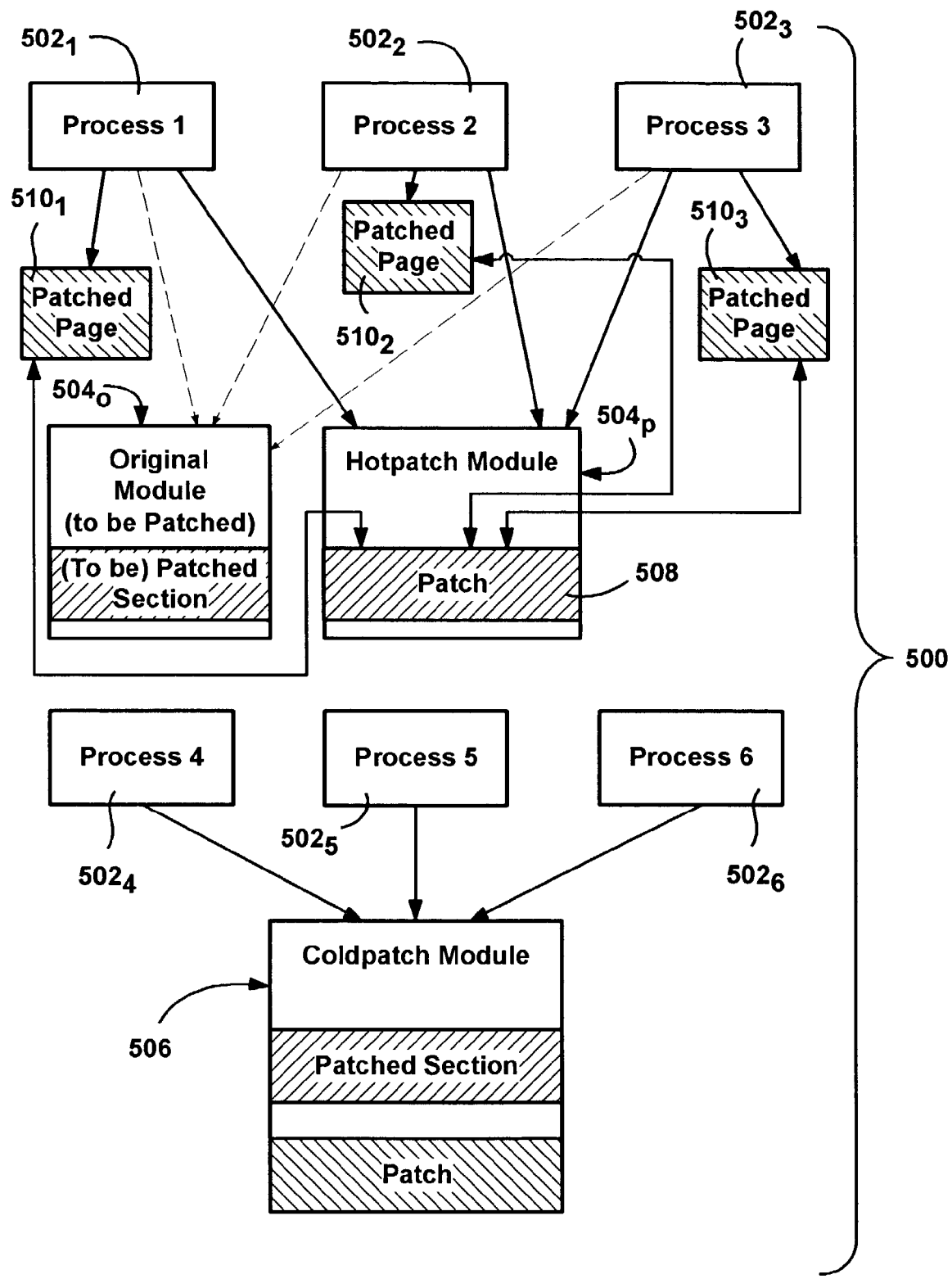
FIG. 5 is a block diagram generally representing one alternative in which in processes run patched code that is installed in accordance with an aspect of the present invention.
Figure 6:
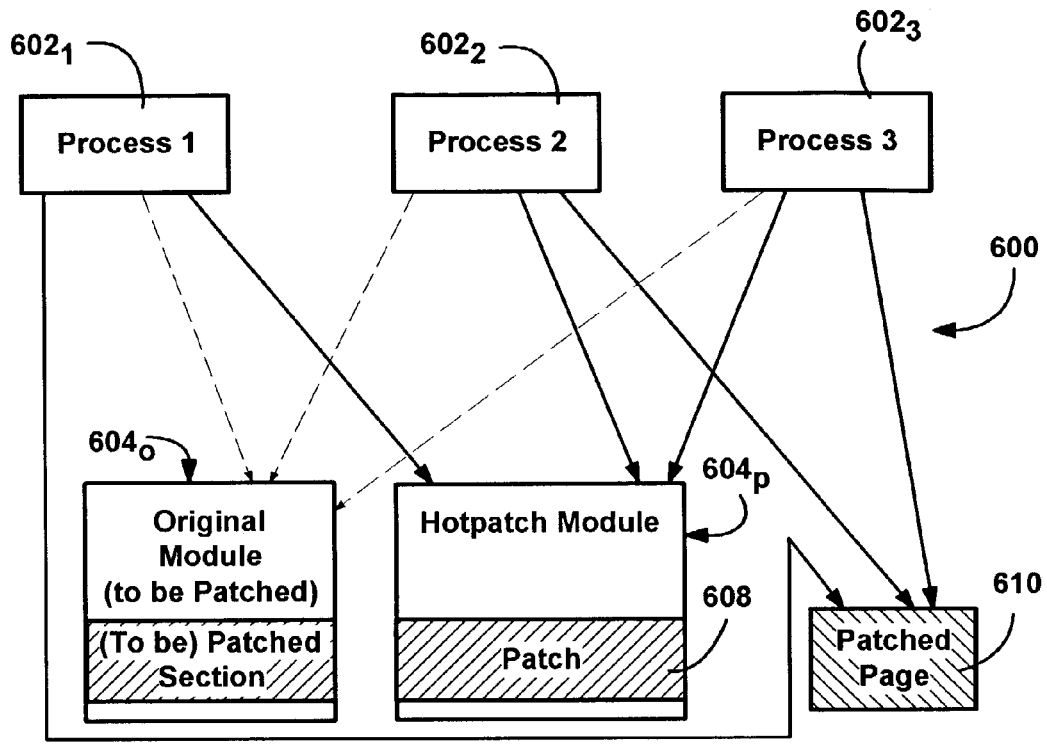
FIG. 6 is a block diagram generally representing another alternative in which processes share a changed memory page in accordance with an aspect of the present invention.

Coldpatching generally handles situations in which a hotpatched module is unloaded, and then a corresponding patched module is reloaded. Coldpatching also handles situations in which a patched module is separately loaded after hotpatching has already occurred, as generally represented in FIGS. 5 and 6.

As described above, the coldpatch files are generated at the same time as the hotpatch files. As also described above, a coldpatch file may be larger than a recompiled version, because a new version of fixed routines is appended to the base version, without deleting the old routines.

Coldpatch generation is similar to hotpatch generation, except that with coldpatching the patch is applied to a binary image of the disk component rather than in virtual memory on the customer's machine. The coldpatch fix in this case affects the patched function and follows the same rules as for hotpatching. Instead of delivering the recompiled binary as the new disk version to accompany a hotpatch, the new disk version can be produced by applying the hotpatch to the disk version of the component. Coldpatch files are generated at a known, safe location, and may be signed to assure safe, secure application. Note that instead of creating the coldpatch file at the manufacturer, it is feasible to have a tool that, upon the delivery of the patch package, creates the coldpatch on the customer's machine based on the original binary, the hotpatch, and other information, which may be included in the patch package. However, note that this alternative method prevents the software manufacturer from signing the application properly, and makes it more difficult to test the coldpatch. Another alternative to delivering the entire coldpatch file is to use a conventional patching technique and send the binary difference between the coldpatch file and the original binary. This may significantly reduce the size of the patch package, because a large amount of the coldpatch file may be mostly identical to the original binary.

As also represented in FIG. 2, the patch package 206 also may contain a copy of full file versions, which the system may need to use based on validation, as described below. The patch package 206 also includes an installer 214 and a manifest 216 that generally provides the installer 214 with installation information, provides validation information, and so forth.

The patch builder 204 preferably comprises a tool that automates the generation of the hotpatches and coldpatches. Such an automated tool is based on a binary difference engine 220 as described in U.S. patent application Ser. No. 10/001, 279, assigned to the assignee of the present invention and hereby incorporated by reference. In general, the patch builder 204 operates by reading in the original binary file $202_{v0}$ (the binary target to be patched) and the new binary file $202_{v1}$ (the binary containing the fix). The patch builder 204 then parses the code and data in each. The opened image of the new binary will eventually generate the hotpatch file, and the opened image of the original binary will become (part of) the coldpatch binary file 210. Note that the existing binaries will not be affected, since the generated images are written out to new files. Further, note that because the hotpatch routines in the hotpatch 208 are identical to the coldpatch routines appended to the coldpatch binary 210, it is possible to eliminate this duplicity by sharing the routines into one file and having an installer extract the routines from the file when needed, thereby reducing the size of the patch package 206.

The patch builder 204 invokes an internal binary difference engine 220 to generate a code and data mapping 222 between the two binaries. In the opened image of the new binary, the patch builder 204 keeps the routines that contain code changes, as well as any data related to the changes, and removes everything else. What remains is the set of code and data that will go into the hotpatch 208. The patch builder 206 also creates a special new header section 224 (e.g., .hotp1) in the hotpatch 208 to hold additional information needed for hotpatching.

The patch builder 204 goes through the kept routines to find a hook location for each one, which may require alignment, e.g., with a 64-bit word as described above. Information on the hook locations, including validation information for each location, gets stored in the header section 224. The patch builder 204 also goes through the kept code and data and find references to any code or data that were removed, e.g., code and data that belong to routines with no changes. These references are redirected to point to the original binary.

Moreover, the reference target may become incorrect after hotpatching if the hotpatch 208 or the original binary gets loaded at an address that is different from what is assumed. Note that this is similar with the inter-module procedure call issue that is normally solved by using imports/exports, however imports/exports cannot be used in this case because the original binary is unaware of the process of hotpatching. To solve this problem, the patch builder 204 stores information on these references in an "external fixup" table in the hotpatch header section 224. When the installer 214 performs hotpatching, the operating system reads the external fixup table and modifies each reference to point to the correct location in the running image of the original binary. The patch builder 204 then cleans up special areas such as exports, imports and resources, and writes out the image as the hotpatch 208.

To create the coldpatch binary file 210, the patch builder 204 appends the code and data included in the hotpatch 208 to the opened image of the original binary, appending the new sections to the end of the image. The result is the set of code and data that will be included in the coldpatch binary. Since this moves code and data from the "new binary" image to the "original binary" image, the patch builder 204 goes through the added sections and modifies import references to point to the corresponding imports in this image. The patch builder 204 also corrects references within the moved code and data to the existing code and data in the original binary. This process is aided by the external fixup table in the header section 224, since it deals with the same set of references.

The patch builder 204 then inserts hooks into the routines to be patched, like the installer 214 will do when performing hotpatching on a running image. The hooks will redirect execution to the new versions of the routines in the sections copied over from the hotpatch 208. The patch builder 204 writes out the processed image as the coldpatch binary 210.

Figure 3:
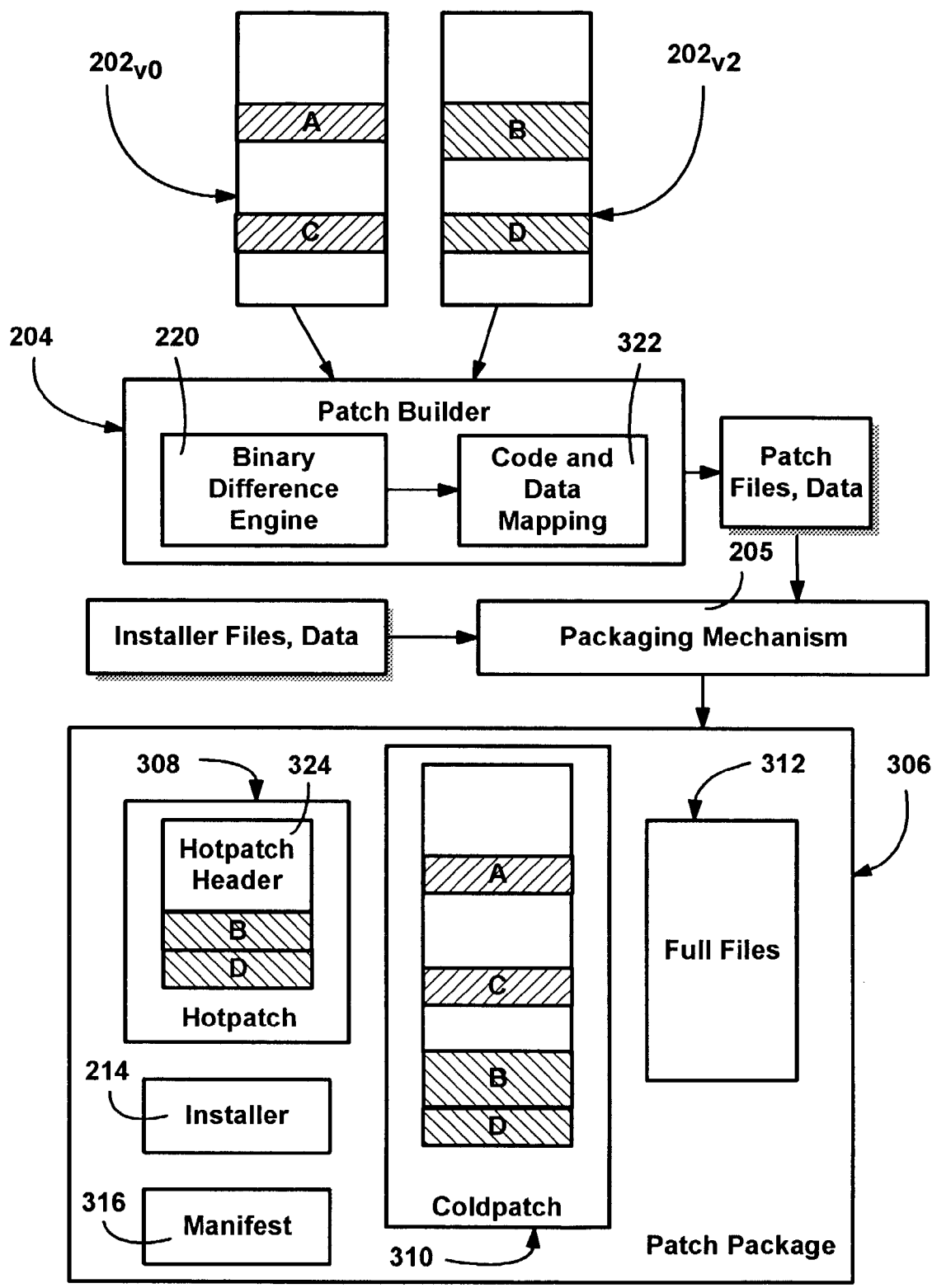

FIG. 3 provides an example of the preparation of yet another hotpatch that needs to be applied to the same running, hotpatched (or coldpatched) code. In the example of FIG. 3, in addition to patching routine A with routine B, a different (previously unpatched) routine, routine C, needs to be patched with a new routine D. Note that as represented in FIG. 3, the patching operation does not patch the previously patched code, but rather the original code, as it existed before any previous patching. Note that it is possible to patch the previously patched code, but it is preferred to patch the original version for easier management, and for (most likely) better performance. To this end, the patch builder 204 opens the original file 202v0 and a newer file, 202v2 with both routine B and routine D present therein. Note that in FIG. 3, much of the operation is the same as in FIG. 2, as indicated by the like-numbered components and data structures, with those numbers changing (e.g., from 2xx to 3xx) generally indicating where data has changed.

As described above, hotpatches are generated by comparing two files, and the hotpatch contains information about how to patch the original file, along with other (e.g., validation information). Additional hotpatches can be generated at a later time by computing the difference between the first (original) file and yet another updated file. The second hotpatch can be applied after the first hotpatch has been applied, because the information about where to replace instructions with the jump to the patched routine will still be correct, and validation (described below) takes into account the previous hotpatch installation. However, if the system is not running the original file or the original file with the first hotpatch applied, but is instead running a file that has been recompiled with the changes in the first hotpatch, then the second hotpatch cannot be applied because the information about where to place the hooks will be incorrect, that is, because routine entry addresses are generally shifted in a recompiled version, the hook information will be incorrect.

A coldpatch binary is produced as a file that is binary-wise equivalent to the original file with respect to routine entry points, and consequentially where the hooks go. Thus, a single version of a second hotpatch can be applied to the original file, to the original file with the first hotpatch applied, and to the coldpatch version that contained the changes in the first hotpatch. A single version of a third hotpatch generated against the original file can also be applied in these circumstances, as well as against the original file with the second hotpatch applied, the coldpatch version containing the second fix, and so on. Note that without a file having such properties, it would be necessary to generate pair-wise versions of hotpatches for every fix against every version in order to generate the correct hook information. The hook information for each hotpatch could be congregated into a single large hotpatch, but would require a more complicated hotpatch generation process than is possible with the coldpatch method. Moreover, coldpatching provides other benefits, such as the reduced memory requirements through better sharing of code between processes.

Figure 4:
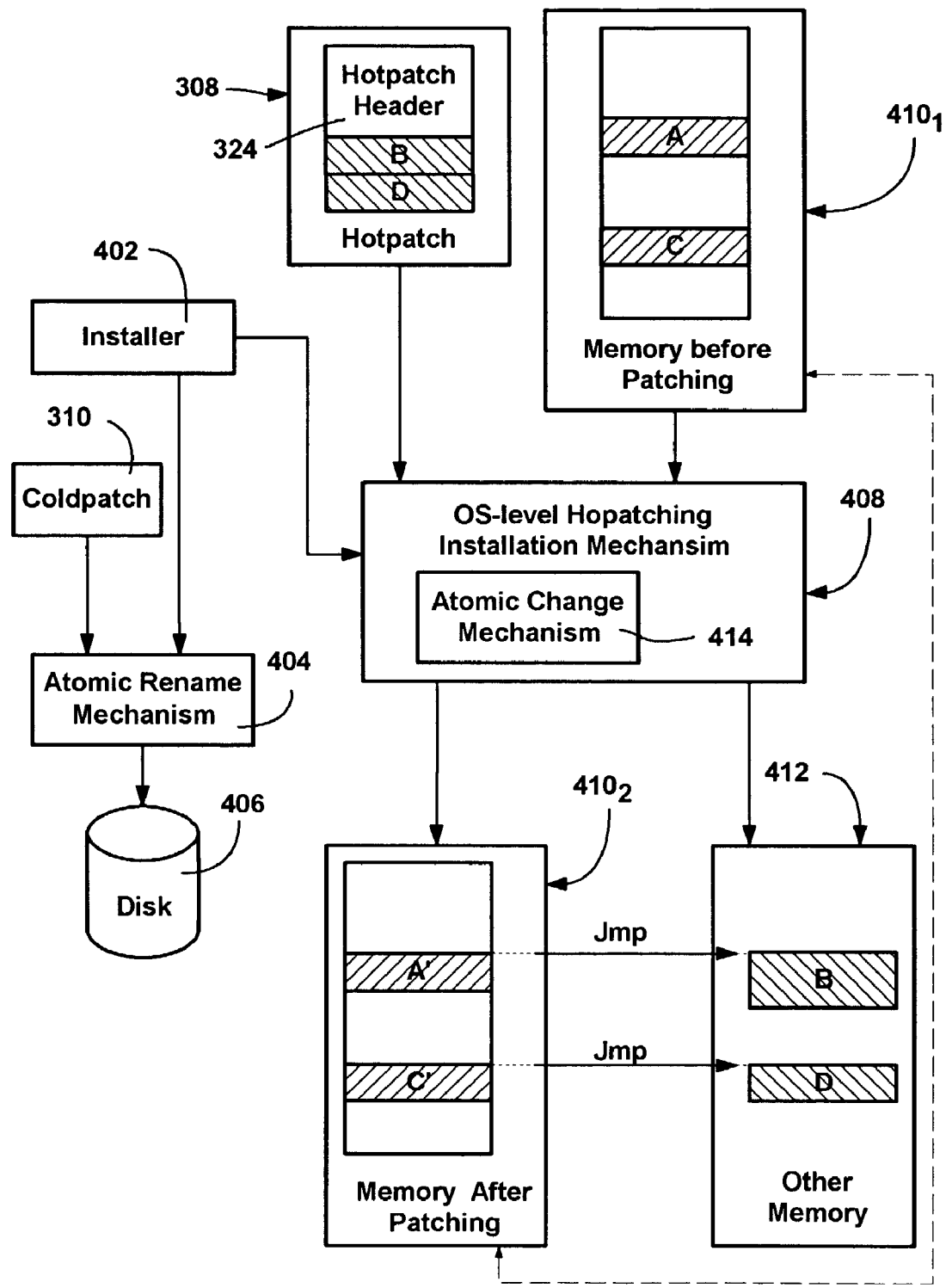
FIG. 4 is a block diagram generally representing the application of a hotpatch, in accordance with an aspect of the present invention.

FIG. 4 shows the result of applying the hotpatch 308 and coldpatch generated in FIG. 3. In general, an installer (update mechanism) 402 calls an atomic rename mechanism 404 to swap the coldpatch with the module on disk 406, as described below. The installer 402 also calls an operating system-level hotpatch installation mechanism 408, which reads the hotpatch header 324 and the actual memory state $410_1$ before patching, which includes an instance of the old module, and loads the hotpatch routines to other memory 412, e.g., allocated to a process that has the module to be patched. The operating system-level hotpatch installation mechanism 408 includes or is otherwise associated with an atomic change mechanism 414 that facilitates an atomic update to memory, for example by suspending any other system processors (other than the one on which the installer 408 is running, and obtaining a lock for that one) by temporarily idling them in non-patched code. Other ways of performing an atomic update are also feasible, e.g., including via interrupts, halts, or by blocking entry to code to be patched and allowing processes already in that section to complete. Note however that a preferred way is to synchronize via the operating system, e.g., via deferred procedure call (DPC) or interprocessor interrupt (IPI), as that makes the hotpatching operation platform independent. Further, note that by suspending the processors, replacing a command with a jump eliminates the need to align the jump with the processor's (e.g., 8-byte) execution unit, since a processor will not be pointing to the replaced instruction in the routine at that time. Note that without such suspension, alignment would be necessary because otherwise the replacement may split an instruction while a processor is pointing to it.

When the atomicity is guaranteed, the mechanism 408 uses the information read from the hotpatch header 324 and the actual before-patching memory state $410_1$ to insert the jump instructions to the routines (B and D) that were loaded into the other memory 412. Note that as represented in FIG. 4, the patches are discontiguous in memory, however they ordinarily would be contiguous. The atomic change mechanism 414 then releases the suspended processors to resume processing. In this manner, any processor that had its instruction pointer on or prior to an inserted jump instruction will make the jump, while any processor that had its instruction pointer after an inserted jump instruction will continue processing in the old routine, at least up until the next patch. As can be appreciated from FIG. 4, suspending the processors (instead of blocking entry to the code) limits the types of code that can be patched to independent routines, as it is possible to have a process execute an old routine (before patching), routine A, as well as a new routine (after patching), routine D, in a single pass through the binary in the memory $410_2$ and 412. An implementation describing operation of an example installation is described below with reference to FIGS. 10-12.

Although FIGS. 2-4 appear relatively straightforward, loading a new version of a routine into memory is more complex than simply allocating memory and loading in a patch from a file. For example, the system needs to maintain a list of the loaded modules within each process, as well as a separate list of modules loaded within the kernel, which is used to find symbols when debugging, and for exception processing. To be capable of being debugged, or to enable the use of exceptions in patched routines, the hotpatches need to be accurately represented in the module list.

As another difficulty, one significant restriction on loaded modules is that the memory each entry describes needs to be contiguous in some systems. The memory may also need to be marked as executable in some architectures. In general, there is only a small amount of room at the end of each module, so extending a module is difficult. Thus, the collection of hotpatches that comprise a fix are provided as a separate module, e.g., a DLL in user-mode, or driver for kernel-mode. As described below, the hotpatch mechanism loads the module into the process (or the kernel) creating a new entry in the module list which can be used to find symbols and process exceptions that occur within the hotpatch.

Still further, as described above with respect to FIGS. 2 and 3, a single routine may need to be hotpatched multiple times, without a reboot between hotpatches. Each new hotpatch for a given routine needs to be applied just like each of the previous hotpatches to the routine, by atomically replacing a single instruction in the original code with a branch to the latest hotpatch. However it is theoretically possible for every previous version of a hotpatch to be simultaneously active in different threads, depending on whether a thread can remain in a previous version of a routine indefinitely (e.g. waiting for a long term event to occur, or if suspended). Thus in general it is difficult to free the memory used by any of the previous hotpatches. However for a specific change which cannot wait indefinitely on an event, if it can be verified that the routine cannot be suspended while executing, it is possible to free the memory used by previous hotpatches to that routine.

If a new process starts or a running process or the kernel unloads/reloads the patched code, (e.g., belonging to a DLL or a driver), the process needs to get the appropriate coldpatched version from disk, as hotpatching only affects currently loaded/running images. Hotpatching also needs to be complemented by providing the complete new version of the file being patched, in case of versioning/validation problems with the coldpatch. The patching facility is careful to check the version of the routine and file that it is about to patch, as well as observing locking requirements for loading new modules.

FIG. 5 is a representation of a number of processes $502_1$-$502_6$ executing a loaded instance of a module in one example implementation 500. Before patching, the processes $502_1$-$502_3$ are sharing the original module $504_o$, as indicated by the dashed arrows in FIG. 5. After patching, as indicated by the solid arrows in FIG. 5, the processes $502_1$-$502_3$ are sharing a hotpatched module $504_p$, while the processes $502_4$-$502_6$ are sharing a coldpatched module 506. These other processes $502_4$-$502_6$ were created after installation of the patch, or unloaded and reloaded the patched file after hotpatching and coldpatching installation, and thus share the coldpatched module 506. In the post-patching implementation, each of the processes $502_1$-$502_3$ running hotpatched code has had an instruction changed to jump to the patch 508, and that change has resulted in a page in memory being modified for each process, as represented by pages $510_1$-$510_3$. In other words, for each patched page, the jump modification effectively dirties a respective page and thus that page can no longer be shared for that process, instead causing a copy-on-write operation that gives the process its own modified patched page.

FIG. 6 shows an alternative implementation 600 in which each of the hotpatched processes efficiently share a modified page 610, since separate pages would be identical. In this alternative, as part of hotpatching, the processes are internally adjusted to share one of the modified pages, instead of each having their own modified page. This is to prevent system degradation over time as more and more patches are installed, since as shown in FIG. 5, there may be a new page needed per process that uses the module, and so on for each patch.

Figure 7:
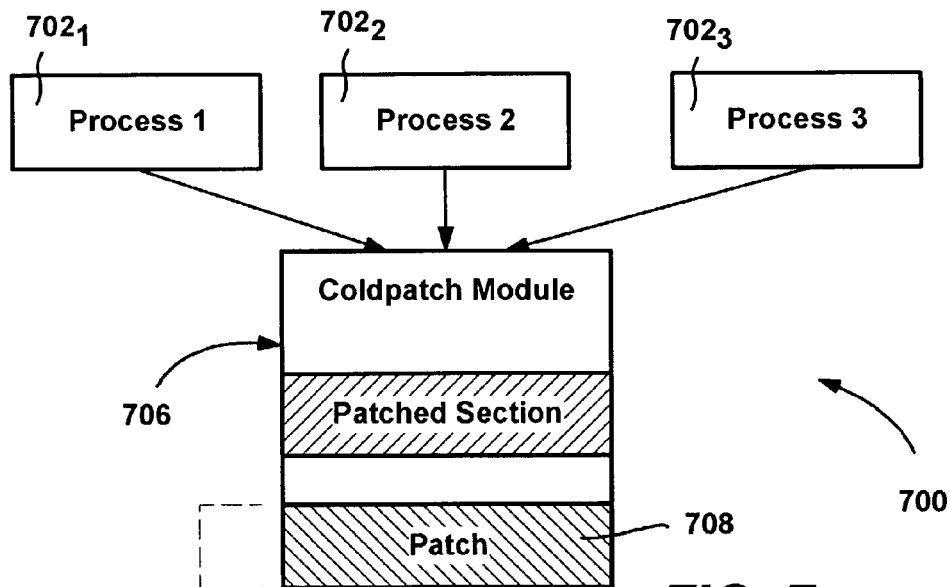
FIG. 7 is a block diagram generally representing another alternative in which processes referencing a module are actually referencing a coldpatch in accordance with an aspect of the present invention.

Along these lines, it should be noted that the patch is also present within the coldpatch binary. Thus, with memory management techniques, the hotpatched processes can effectively share the code in the coldpatch, as generally represented in FIG. 7. More particularly, by extending the module, memory management can effectively insert a coldpatch 706 on a running process. To this end, the memory management system extends the original module (not shown) to put the patch 708 at the same place it would be with respect to the coldpatch. To replace the jump instruction, instead of modifying the page (and thereby giving each process its own modified page), the memory management system effectively replaces the meaning of the reference that each process has to each original page in the module being hotpatched, effectively pointing it to the corresponding coldpatch page, which has the instruction that jumps to the patch 708. Note that this can be accomplished in memory management, without changing the processes, by changing the disk file that is backing the memory, so that when swapped into memory from disk, the swapped-in page will be automatically obtained from the coldpatch file. At this time, the original module (disk-backed) is no longer part of the process because the coldpatch module on disk has been substituted instead. Processes that load the coldpatch module later will share the same pages in memory because they are backed by the same coldpatch file on disk. Note that the original module (that was patched) is not shown in FIG. 7, because it is no longer needed, as memory management has replaced the original module with the coldpatch module 706.

Coldpatching requires the replacement of an existing file, however an existing file that is in use cannot be directly replaced on a system, and thus to do so may require two operations, namely rename the existing file to a temporary new name, and then copy the new version; e.g., rename foo.dll to tmp1.dll, and then rename newver.dll to foo.dll. A problem is that between these two operations, there is no foo.dll on the disk, and if the system is asked to load foo.dll in this timing window, then some unexpected failure will occur, which in some conditions may shut down the system.

The present invention solves the above problem by using an atomic double rename operation. For improved system performance, the atomic rename occurs in a reduced timing window during which the file is prevented from being opened. Because copying a new file over might be a long operation, depending upon the file size, network conditions and so forth, the timing window between these two operations is reduced by copying the new file onto the same storage as the file to be replaced, e.g., foo.dll, but with a temporary name e.g., tmp2.dll. In this manner, the actual replacement is then done via a copy and two rename operations, as the rename operations are significantly faster than copying over a large file, for example:

1. copy NewVer.dll as tmp2.dll
2. rename foo.dll→tmp1.dll
3. rename tmp2.dll→foo.dll.

To completely close the timing window that still exists between the two rename operations (numbered 2 and 3 above), the present invention implements an algorithm with retry semantics, essentially providing a share/exclusive lock. Note that one way to close such a timing window is to add a new global lock to the system, and acquire the lock as shared for every file open call, or acquire the lock exclusively during the timing window between the two rename operations. However, adding a global lock for these heavily-exercised paths may negatively impact the system performance, particularly on multi-processor machines. Note that even a shared lock requires some write operations to a memory location that is potentially shared between several processors, causing cache collisions. Further, renaming a file can have arbitrary ramifications depending upon the file system, filter drivers and so forth, which can possibly expose the system to deadlocks. For example, consider that the rename operation causes an anti-virus filter to synchronously log an entry in a file, which would attempt to open the log while the I/O lock was exclusively held.

Instead of the global lock solution, a solution to handle these scenarios recognizes that the common path (file open and create) only uses read operations, whereby multiprocessor scalability is not affected. Shared access is permissive, and because file related calls go in parallel with the rename operation, the system only retries for failure paths. In other words the system synchronizes with the failure paths for open file requests, and provides a fast, scalable non-global lock. The following is an example algorithm for the atomic rename operation in which the share paths (and most common called) have no write operations to global variables:

```
; There is a global sequence number named Seq,
; initialized with the value 0
; The installer implements replace(A,B,C) with code such as:
CrtSeq = Seq
If ((CrtSeq & 1) == 0)
        &&
    (AtomicCompareExchange(&Seq, CrtSeq + 1, CrtSeq)
            == CrtSeq)) {
; increment global Seq, but do not allow a transition from
; an odd number (the last bit, if set, means "locked - do
; not do)
; use InterlockedCompareExchange API as the
; AtomicCompareExchange function in a Windows ® environment
rename B to C
rename A to B
AtomicIncrement (&Seq)
; incrementing Seq switches the last bit back to 0,
; which is the "unlocked state"
; use InterlockedIncrement API as the AtomicIncrement
; function in a Windows ® environment
    }
; Open-File-Function includes a change such as:
do {
    SaveSeq = Seq;
    status = Old-Open-File-Function ( )
} while ((status != SUCCESS) && ((SaveSeq & 1) || (SaveSeq
!= Seq)));
; retry the open if the file is not found, as the
; installer might be between the two Seq++.
; If more that one double rename is attempted at the same
; time, all but one will fail (but this is OK because the
; installer uses this operation via a single thread)
```

Alternative variations of the double atomic rename operation are possible, including an atomic swap operation which swaps the name of two files, i.e. the existing file and the coldpatch file. Atomic rename and swap operations may also be implemented directly in a file system in which it is possible to atomically modify the entries in a directory so that the above-described timing window does not exist.

Figure 8:
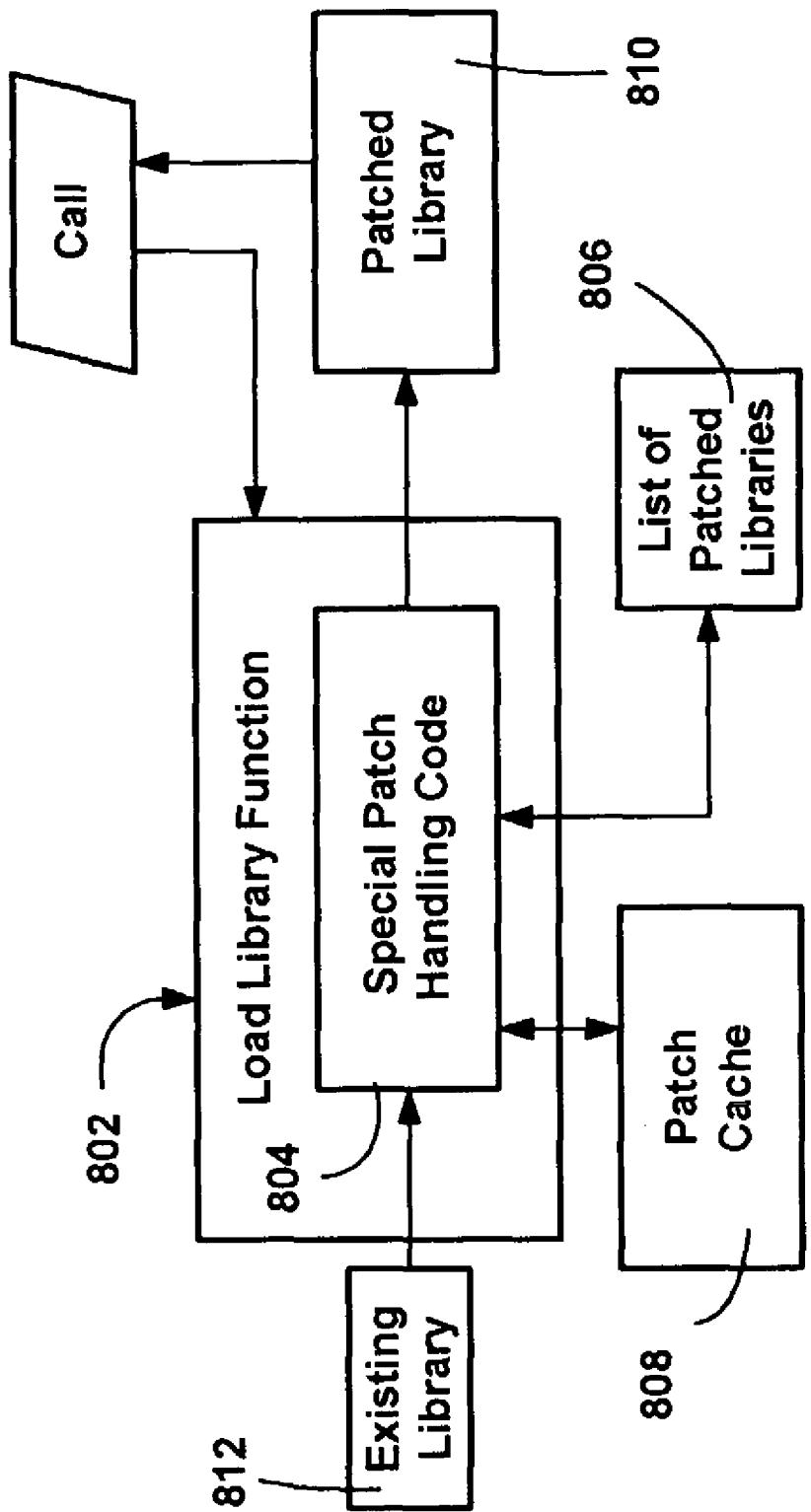
FIG. 8 is a block diagram generally representing an alternative to renaming to achieve coldpatching, in which in a file loader substitutes a binary file with an updated patch for another file in accordance with an aspect of the present invention.

Various alternatives to coldpatching are also feasible. For example, one alternative is referred to as perpetual hotpatching, in which only the hotpatch file is generated. For example, FIG. 8 shows a perpetual hotpatching alternative, in which a load library function 802 (or similarly the load driver function in the kernel) is provided that includes special patch handling code 804 that looks for components that are to be loaded and that have a corresponding patch. Whenever a call to the load library function 802 is made, the special code 804 looks to a list 806 to determine whether the file to be loaded is to be patched. If so, the code accesses a cache 808 of patching data, e.g., the hotpatch data, and applies the patching data to the existing library binary 812 to dynamically generate a patched library file 810, which is then loaded. Other alternatives may be based on file redirection. Note that while perpetual hotpatching and other alternatives are feasible, coldpatching has a number of advantages with respect to them, e.g., with respect to performance.

Validation

Because hotpatching modifies the code on a running system, even a minor mistake in determining whether the target file is the one to be patched would put the system into an unstable state, particularly if a mistake occurs in kernel mode patching or with other critical processes. Note, however, that the present invention is not limited to operating system-level components, but also applies to patching application-level components and programs. For example, there may be multiple instances of an application program running simultaneously. The application program instances and image can be hotpatched and/or coldpatched, as well as DLLs that the application program uses.

Another problem with hotpatching involves the interaction with code modifying tools, such as a debugger, wherein the patching operation may write over a breakpoint instruction added by a debugger, which will generate an invalid instruction when the debugger restores the initial value. Similarly, because the hotpatch system is also a code modifying tool, problems occur with potential overwriting in cases where a new patch is applied over an existing one.

To solve the above problems and others, the present invention includes binary and code validation, performed in multiple stages. Note that because the format of a hotpatch is flexible, one or more validation techniques may be selected based on real scenarios.

General validations are directed towards the target file as a whole, and may include file name validation to ensure that the patched file has the correct name, and program executable (PE) header validation, in which a 64-bit normalized hash is generated for the PE header of a target file. The hash computation excludes fields from the header that vary with localization, (that is, the resource section of the executable may contain data-like strings specific to a localized version of the system), e.g., to allow validation of a binary such that the same hotpatch can be used regardless of the underlying language. Note that when performing header validation, the installer expects the original header, however the header is different for a coldpatch. To handle this difference, the coldpatch stores a hash of the original header, and the installer, recognizing that the file is a coldpatch, accesses the stored hash value in the coldpatch to validate.

File checksum validation may be used to verify that the binary checksum matches the target, providing a relatively strong method of validation. Arbitrary code validation uses validation ranges in the hotpatch image, such as specified with an offset from a base address, the size of the range and the code that is expected to be at that offset in the target binary. To make the validations stronger, a byte-by-byte code comparison may be made of the function being modified, or just portions of functions. Because the format is flexible, almost any data inside the target may be compared, including code other than the patched function. Since the code is invariant to resource change (which appears at localization), arbitrary code validation may be used in conjunction with PE header validation to provide a stronger validation with cross-language patching.

Specific validations may be performed on the bytes to be modified by the hotpatch mechanism, e.g., with a jump instruction or the like. Specific validations may have compare-exchange semantics, which may be performed in the kernel just before the code is modified. When several changes to the same binary are applied at the same time, the failure to validate one hook will stop other modifications.

Note that comparing the code to be changed will result in a failed comparison whenever a piece of code was previously patched, which if not detected would prevent the application of subsequent patches to the same binary. A special method is used to detect these cases and allow patches to be applied on the top of existing ones. In general, the method is performed when a byte-by-byte comparison fails, and operates to search existing patches. Note that the installer may access a list of current hotpatches applied to the binary, and each one contains also the original code replaced. If a hotpatch that modified this code is not located, a test is performed to determine whether this is a coldpatched binary, and then validate whether the jump instruction is pointing inside the same module. If none of these conditions are satisfied, this binary is not patched, as it is likely that some other tool modified the code.

In case of success, the existing content is preserved, because the kernel routine needs to atomically check if something was validated but replaced with a different code (e.g., as a result of a race condition with a tool). Preserving the existing content also enables the system to undo a patch by restoring the original content. The method automatically disables the patches in the reverse order relative to their installation order, that is, in a last-in, first-out (LIFO) stack model.

Version Management

Figure 9:
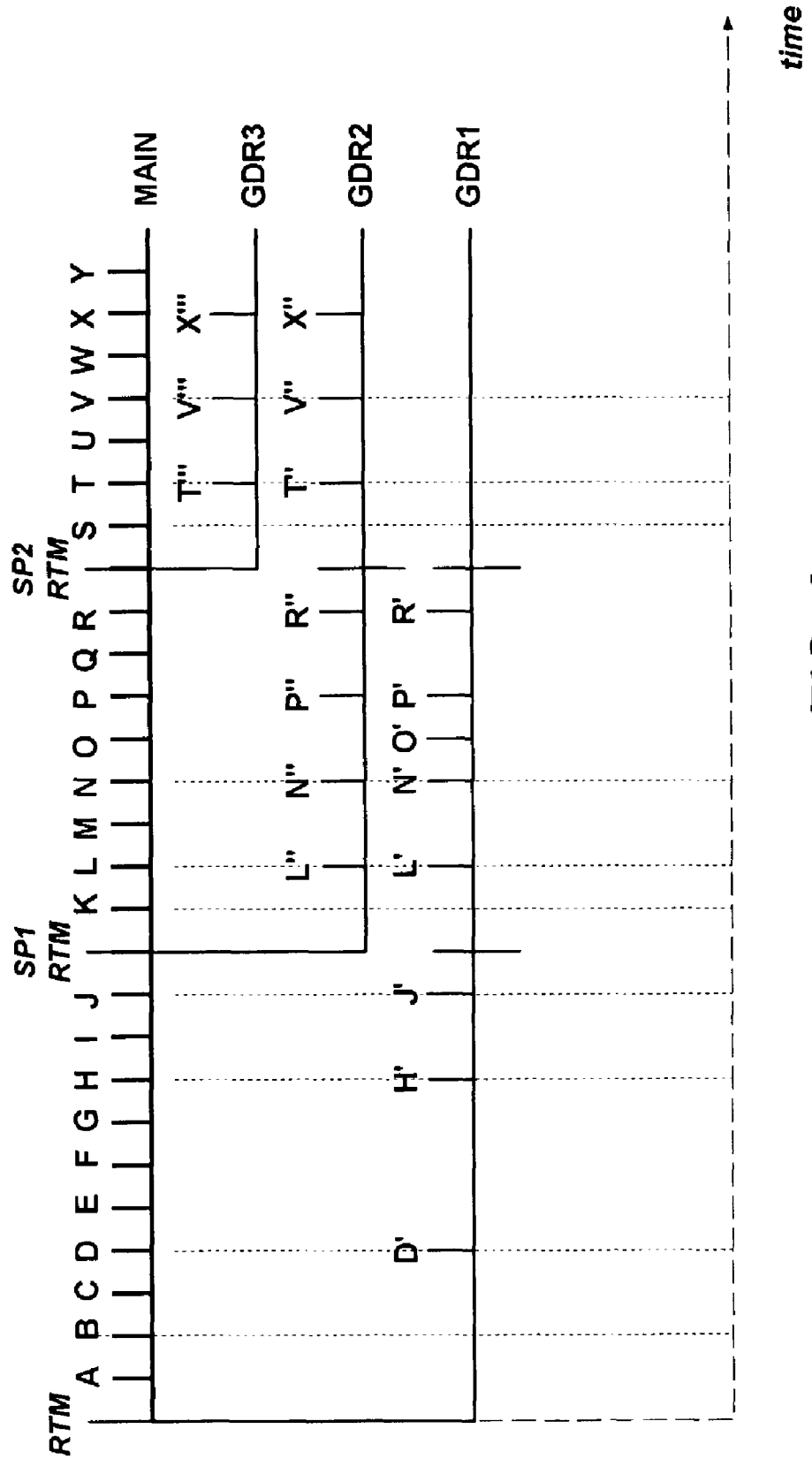
FIG. 9 is a timing diagram generally representing versions of patches and branches for those patches over time, as controlled by support rules, in accordance with an aspect of the present invention.

As can be readily appreciated, significant complexity can arise in managing a sequence of hotpatches and coldpatches, such as when hotpatches and coldpatches are intermixed with non-hotpatchable fixes on machines with an arbitrary history of reboots and versions. As releases of the source code take multiple branches over time that need to be supported, as generally represented in FIG. 9, the number of versions can essentially explode, presenting a significant packaging and version management challenge. Versioning problems arise because a hotpatch and coldpatch are generated by comparing two files, however the operating system may have multiple versions of a component, due to earlier patches, and patches may need to be generated for each earlier version.

By way of example, consider a system that is running an unpatched instance of a module, and another system that is running a patched instance of the module. If another fix then becomes available, there will need to be two versions, namely one version that patches the unpatched module, and one that patches the patched module. As more fixes are developed, the number of versions grows significantly. Note that it is feasible to automate version management of such large numbers of versions, and to automatically scan a customer's computer to determine the correct version for a given patching operation, however as the number of patches grows, this would require significant resources.

One solution is to never provide a new version, but instead apply the existing set of hotpatches to a component every time a program is executed or DLL loaded, that is, perform perpetual hotpatching as described above. This may negatively impact system performance, however. Thus, a preferred alternative is to perform coldpatching, as also described above.

To build hotpatches and coldpatches, appropriate changes are made to the original source code, and then the original and changed files are compared to differentiate the original and updated binaries. Because any binary can undergo several changes, to generate each hotpatch and coldpatch, the generating system needs to maintain several branches for a respective released version of the binary, as generally represented in FIG. 9. At the same time, any given package would need to carry hotpatches and coldpatches for all the previously released version of the binary, as any given computer can have any previously released version of the binary. The complexity will continue to increase as more versions of the binary are generated.

As represented in FIG. 9, this complexity may be made more manageable by only supporting certain branches, e.g., for hotpatching and coldpatching fixes (fixes), the patching service would only support cardinal releases, e.g., in one implementation generally referred to as service pack (SP) level N and N-1. As a result, any given fix can only be applied to SP level N and N-1. By maintaining such hierarchical data and following these support rules, installation of fixes on SP levels outside of the N and N-1 boundary is blocked. For example, a post SP2 (wherein the latest SP is N) fix can only be installed on SP2 and/or SP1; if a user attempts to install this fix on the original RTM (release to manufacturing), the installation would terminate with an error message. Note that the hierarchy may be maintained on a file stored at each hotpatched system, whereby the installer can quickly obtain the information needed to manage versioning.

The same type of policy may be used to limit the number of permutations that hotpatching and coldpatching are required to support. Fixes that are hotpatch and coldpatch "aware" may support the latest General Distribution Releases (GDRs) off of the SP Level N and SP Level N-1.

As represented in FIG. 9, by such rules, fixes have two servicing branches for each specific milestone (e.g., an SP Level). One branch in this model comprises the conventional cumulative fix branch which would undergo fixes, General Distribution Releases (GDRs), Design Change Requests (DCRs) and SP-only fixes, while the other branch would strictly service GDRs, (both hotpatch aware GDRs and conventional GDRs). GDRs are cumulative in their respective branch, e.g., the latest GDR will be carrying the previously released GDR for that binary, both hotpatch and conventional.

Note that because GDRs do not cumulatively carry all the fixes, (like a conventional fix specifically requested by a customer), a scenario may appear in which customer installs a conventional fix $Q_B$, and then installs a GDR $Q_D$. As $Q_D$ is a later fix, it would not have the change $Q_B$ has and if allowed would regress the previously installed fix if the fix installation installs the binary off the GDR branch. Instead, the hotpatch-aware packages also carry a binary derived from the fix/MAIN branch, and the fix installer in this situation promotes the binary to the fix branch to prevent this regression.

Example Installer

Figure 10:
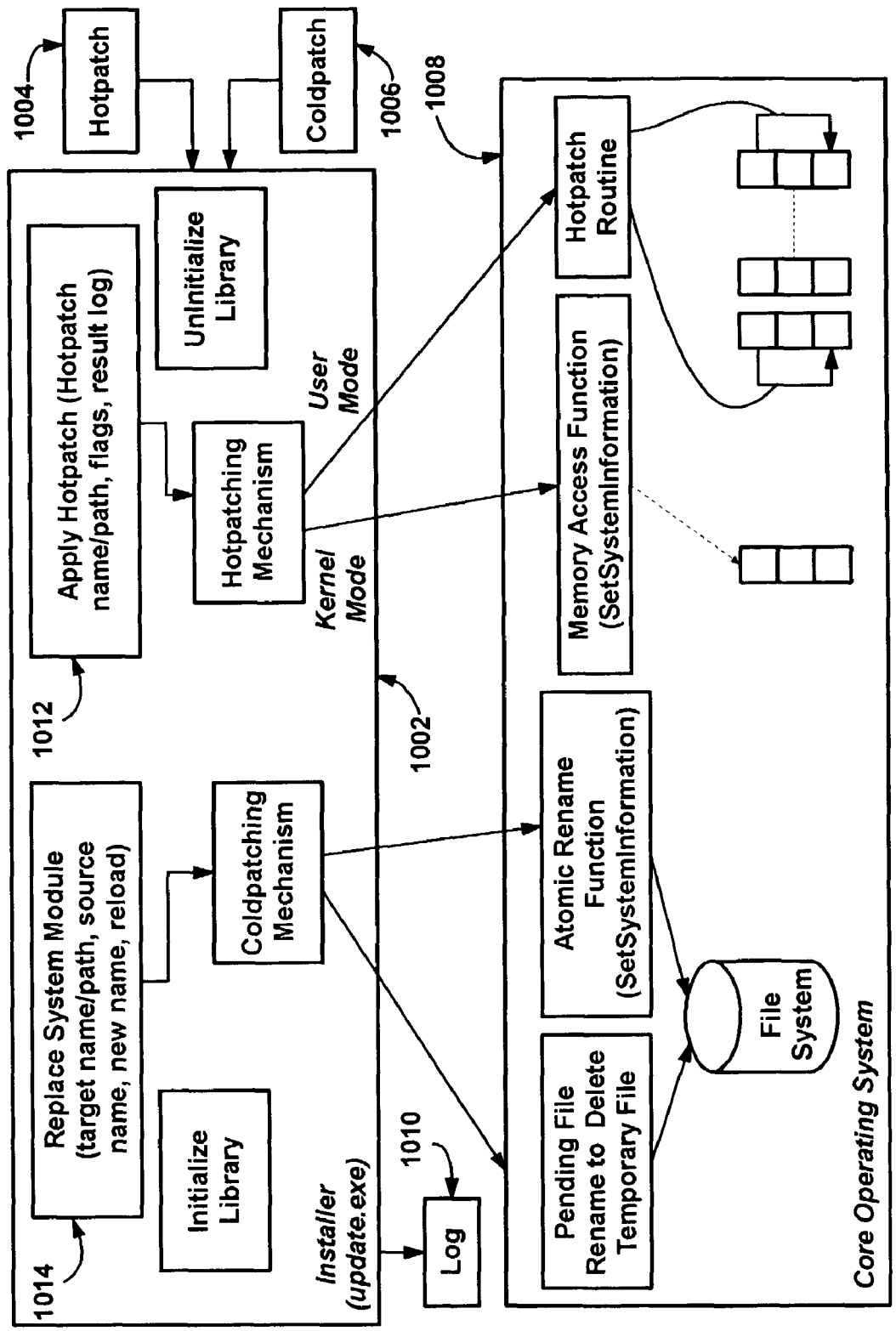
FIG. 10 is a block diagram generally representing installation of a hotpatch and coldpatch in accordance with an aspect of the present invention.
Figure 11:
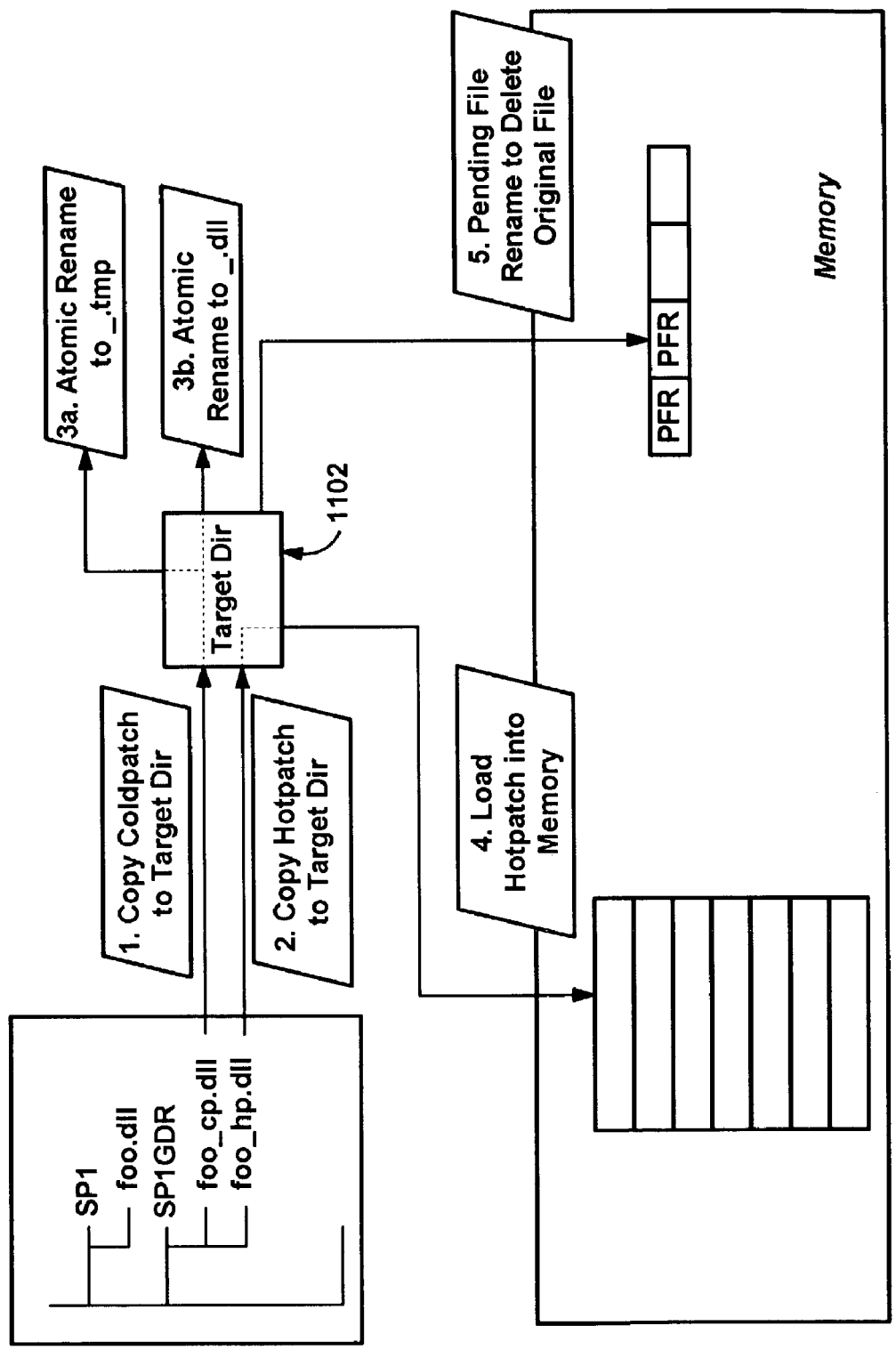
FIG. 11 is a representation of file move and other operations related to the installation of a hotpatch and coldpatch in accordance with an aspect of the present invention.
Figure 12:
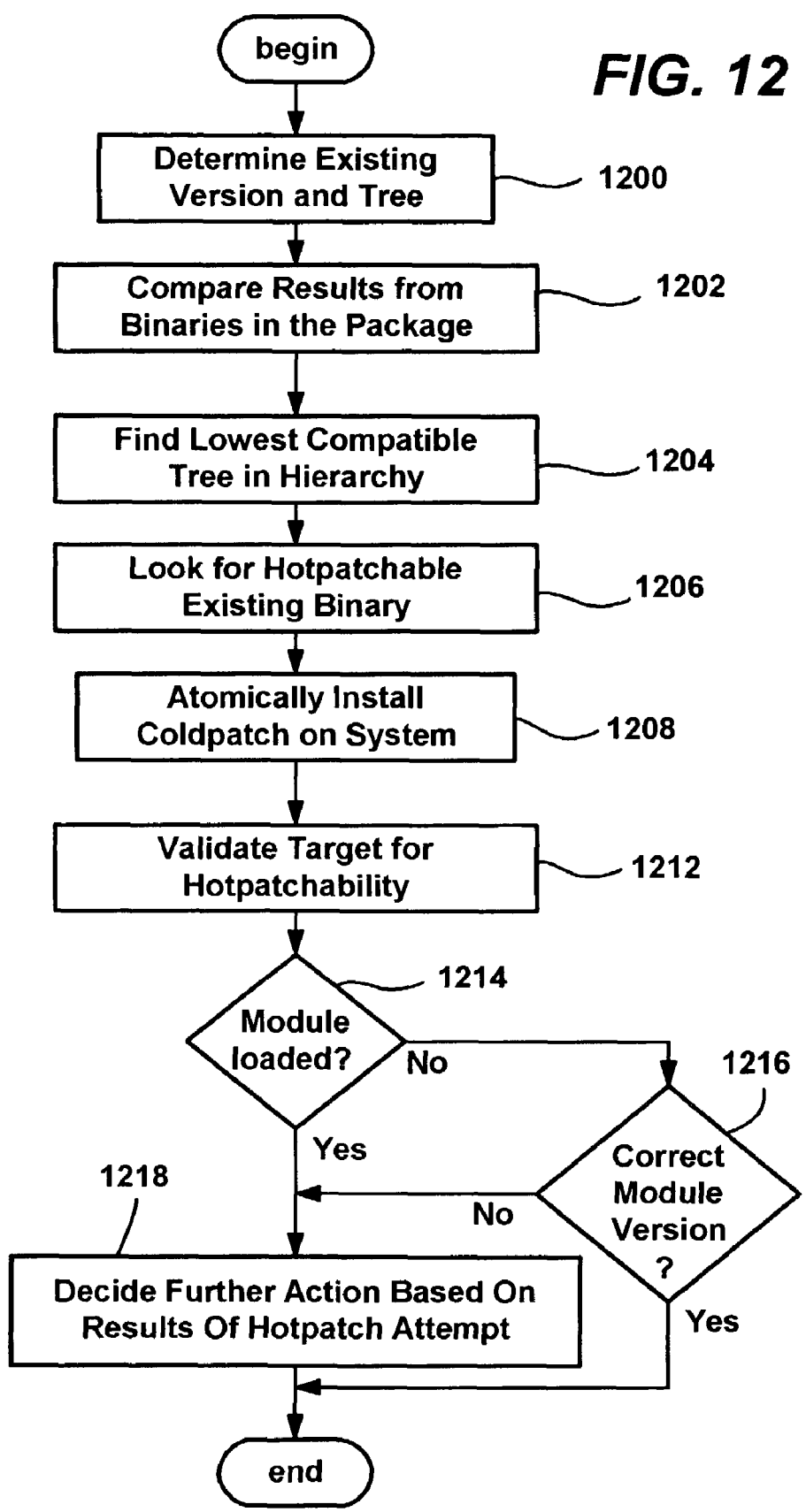
FIG. 12 is a flow diagram generally representing the installation of a hotpatch and coldpatch in accordance with an aspect of the present invention.

FIGS. 10-12 generally represent an example implementation showing the interaction between an installer 1002 (e.g., named update.exe), a hotpatch 1004 (e.g., hotpatch.dll) and coldpatch 1006, and core operating system code 1008. As represented by step 1200 of the flow diagram of FIG. 12, the installer 1002 (FIG. 10) determines a version and value in the hierarchical tree for the existing file that is to be patched, and at step 1202 compares the results of this determination with the binaries in the patch package, (which as described above may be the package in which the installer was provided). At step 1204, the installer 1002 finds the lowest tree in hierarchy that is compatible with the binaries, and uses that tree to look for a hotpatchable existing binary (step 1206), and if coldpatching is the method used for loading the patch into new or reloading processes, a corresponding coldpatchable existing binary.

As represented in FIG. 11 by the numbered trapezoids (1) and (2), assuming the binaries are found, the installer 1002 (FIG. 10) copies the coldpatch and hotpatch to a target directory 1102. As represented by the trapezoids numbered (3a) and (3b) in FIG. 11, and by step 1208 of FIG. 12, the installer 1002 atomically installs the coldpatch on the system, using the atomic rename operation as described above, e.g., coldpatches may be installed via an atomic rename function, that when invoked renames the existing binary to a temporary file name, which needs to be deleted at the next reboot. This will be done by creating a delete pending file rename (PFR) entry for the original file.

The installer then attempts to hotpatch the appropriate processes, including validating the target process for hotpatchability (step 1212). For example, as generally described above, the installer 1002 uses hotpatch file information entries to determine whether the target file has a matching hash value with an entry, and if so, marks the file for install. If the hash of the installed file does not match any entry in the hotpatch file information, then the installer 1002 instead marks this package as not having any hotpatch for this state of the computer, and continues its analysis to determine which coldpatch to install.

To determine which coldpatch version to install, an information file in the package (e.g., spbranch.inf) and a catalog which has information on the currently installed file are used. For versioning, the installer 1002 queries the operating system to determine the SP Level of the platform, which indicates the branches that the package expects to have binaries for. The installer also accesses a file that contains the tree hierarchy, as described above. With this information, the installer 1002 then queries the catalog database by asking what catalog vouches for the file the installer is about to replace. Using the catalog which vouches for the binary, the installer 1002 queries the branch attribute of the file, which deterministically indicates to the installer 1002 whether the installed binary is from a conventional fix branch or a GDR branch. If the installed binary is from the GDR branch, the installer 1002 chooses the appropriate coldpatch from the GDR branch, otherwise it would use the appropriate conventional fixed binary. Regular version rules would be used to determine whether to install coldpatch, and once a coldpatch candidate is chosen, it is essentially promoted to a "do not delay until reboot" level.

Various validations may be performed on the coldpatch, including that the module to be replaced has the correct checksum and/or other validation data (step 1216). If there is an error, the installer can decide a further action, such as based on the results of hotpatching. For example, if the installer 1002 could not find appropriate hotpatch candidate to install, then the installer 1002 may warn the user (in attended mode) that it is unable to find matching hotpatches, and if the installation is continued any further, the installer 1002 will require a reboot. Also, if no catalog can vouch for the installed binary (e.g., because the binary was modified by user or some virus), the installation will end in an error. Further, if there is already a better version of coldpatch installed on the computer, then the installer 1002 may run through the installation like a conventional fix, without actually replacing any binary. Also, as described above, migration of the binary to an appropriate level may be required to ensure that installation of a conventional fix or service pack does not regress with respect to the version of the binary content that is used.

For ease of maintenance and support, the installer 1002 may log details of the operation performed when in hotpatch mode, including what process the installer 1002 was able to successfully patch in memory. This information is known to the hotpatching library, and the installer 1002 may send a result table to the interface API 1012 that applies the hotpatch. For example, each row in a result table may maintain information about the program identifier (PID) of the patched process, a status/success code indicating a result of the attempt to install the patch, and the location of the error (if installing the patch failed). Note that the ApplyHotPatch API interface and mechanism, and the replace system module API 1014 interface and mechanism respectively encapsulate most of the hotpatch and coldpatch installation functionality.

During hotpatch and coldpatch installation, the corresponding installation API expects that the hotpatch and coldpatch files exist in the same target location as that of the target binary. Also, to ensure that hotpatch names do not collide, a unique temporary file name may be used to copy the hotpatch to the target directory, e.g., the temp file name may follow an hpfXXXX.tmp nomenclature, where XXXX is unique hex number. The coldpatch is copied to the target directory as a temporary file to avoid any name collision, for example with the temporary file name following a _######_.tmp nomenclature, where ###### is unique decimal number.

The file move operations are represented in FIG. 11, as described above. Also represented in FIG. 11 by the trapezoid numbered (5), following the atomic rename installation of the coldpatches, the existing binary is renamed to a temporary file name which needs to be deleted at reboot time. This is accomplished by creating a delete pending file rename (PFR) entry for the original file.

As can be seen from the foregoing detailed description, the invention provides a comprehensive method and system to safely update a computer system in a manner that reduces the need to reboot. The method and system thus provide significant advantages and benefits needed in contemporary computing.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method comprising:
   in response to a request to patch a running instance of a software module:
   automatically performing a validation to determine whether a hotpatch file that may be used to patch the running instance includes data that is appropriate for patching the running instance, the data including a patch; and
   if the validation indicates that the data is appropriate, automatically installing the patch, including loading the patch in memory and modifying code in the running instance to jump to the patch.

2. The method of claim 1 wherein performing the validation comprises comparing a file name of a file corresponding to the running instance to be patched.

3. The method of claim 1 wherein performing the validation comprises, comparing code bytes in the hotpatch with code bytes in the running instance to be patched.

4. The method of claim 1 wherein performing the validation comprises, evaluating a hash value associated with the hotpatch against a hash value associated with the running instance of the software code module.

5. The method of claim 4 wherein the hash value associated with the hotpatch comprises a hash of at least part of a program execution header.

6. The method of claim 4 wherein the hash value associated with the hotpatch comprises a hash of at least part of a program execution header, and wherein performing the validation further comprises, comparing code bytes in the hotpatch with code bytes in the running instance to be patched.

7. The method of claim 1 wherein modifying code in the running instance to jump to the patch comprises swapping into memory a modified page from a non-volatile storage.

8. The method of claim 1 further comprising, installing a coldpatch file on a storage device in place of an existing module file from which the running instance of the software code module was loaded, the coldpatch file comprising an image of the patch and an image of the existing module file.

9. The method of claim 8 further comprising, loading an instance of the software module from the coldpatch file in storage, including loading an instance of a patch and a modified instance of the existing module, wherein the modified instance jumps to the patch instance instead of executing another section of code.

10. The method of claim 8 wherein modifying code in the running instance to jump to the patch comprises swapping into memory a page from the coldpatch file.

11. The method of claim 8 further comprising, automatically performing another validation to determine whether the coldpatch file that may be loaded is appropriate for storing in place of the existing module file.

12. The method of claim 8 further comprising, storing a hash value associated with the hotpatch in coldpatch data, and performing another validation, including attempting to evaluate a hash value associated with the hotpatch against a hash value associated with the running instance of the software code module, determining that the coldpatch data is present, and accessing the hash value stored in the coldpatch data to perform the evaluation.

13. The method of claim 8 further comprising, performing another validation including file checksum validation to verify that the coldpatch file is appropriate for replacing the existing module file.

14. The method of claim 8 further comprising generating the coldpatch file from a copy of the existing module file.

15. The method of claim 14 further comprising, validating that the coldpatch file matches the existing module file by obtaining a hash value indicative of the copy of the existing file from which the coldpatch file was generated, and comparing it with a hash value obtained from the existing module file.

16. The method of claim 1 further comprising, receiving a request to load another instance of the software module, and in response to the request, dynamically generating and loading a modified module based on an image of the patch and an image of the existing module file, wherein when executed, the modified module includes code that jumps to code in the patch.

17. The method of claim 1 further comprising, performing another validation to evaluate the modified code in the running instance.

18. The method of claim 1 wherein the validation does not initially indicate that the data is appropriate, and further comprising, determining whether the patch corresponds to a coldpatch, and if so, determining whether a jump instruction that should jump to the patch is pointing within the same module.

19. The method of claim 1 wherein at least one other processor is executing code in the computing environment, and wherein modifying code in the running instance to jump to the patch occurs after suspending all but one processor from executing in the running instance until the code is modified.

20. The method of claim 1 wherein modifying code in the running instance to jump to the patch comprises modifying at least two locations in the running instance, each modified location being changed to jump to a respective location in the patch.

21. In a computing environment, a system comprising:
   a first data structure comprising a first software module having functions at defined entry points with respect to the first software module;
   a second data structure comprising a second software module having functions at defined entry points with respect to the second module, including a modified function that is changed with respect to a function in the first file; and
   a patch generation tool that reads the first and second data structures to generate a patch that includes the modified function, the patch generation tool further configured to generate patching information on how to change at least one instruction in a loaded instance of the first software module to jump to the modified function in a loaded instance of the patch.

22. The system of claim 21 wherein the patch generation tool packages the patch and patching information in a hotpatch.

23. The system of claim 22 wherein the patch generation tool stores data in the hotpatch from which a version of the hotpatch can be determined.

24. The system of claim 21 wherein the patch generation tool that reads the first and second data structures further generates a coldpatch file, the coldpatch file comprising a modified image of the first software module and an image of the patch, the modified image of the first software module comprising an instruction such that when the modified image of the first software module is loaded and the instruction is executed, the instruction transfers the execution to a loaded instance of the patch image.

25. The system of claim 24 wherein the patch generation tool stores data associated with the coldpatch file from which a version of the coldpatch file can be determined.

26. The system of claim 24 wherein the patch generation tool packages the patch and patching information in a hotpatch file, and stores the hotpatch file and coldpatch file in a package.

27. The system of claim 26 further comprising, transferring the package to an installer on a remote computer system.

28. The system of claim 27 wherein the installer interprets the package to load the patch in the hotpatch for processes currently running an instance of the first software module, and for modifying code in the instance to jump to the patch, and further interprets the package to save the coldpatch file to automatically load for processes that will later request an instance of the software module.

29. The system of claim 28 wherein the installer saves the coldpatch file via an atomic double rename operation in which an existing file having an existing name is renamed to another name and the coldpatch file is renamed to the existing name.

30. The system of claim 21 wherein the patch generation tool generates the patch to include another modified function, the patch generation tool further configured to generate patching information on how to change at least one other instruction in the loaded instance of the first software module to jump to the other modified function in the loaded instance of the patch.

31. In a computing environment, a method comprising:
performing a validation to determine whether a selected hotpatch version is appropriate for patching a first instance of a software module, and if so, installing the selected hotpatch version for processes running the first instance, including a) loading a first patch that is present in the hotpatch version, and b) modifying a routine in the first instance of the software module to jump to a routine in the patch when executed;
performing a validation to determine whether a selected coldpatch version is appropriate for replacing a stored image of a software module, and if so, storing the selected coldpatch version, the selected coldpatch version comprising an image of the patch, and an image of the software module with a routine modified therein to jump to a routine in the patch when executed; and
in response to a request to load an instance of the software module, loading the coldpatch as a second instance.

32. The method of claim 31 wherein a plurality of processors are executing in the computing environment, and further comprising, suspending all but one processor before modifying the routine.

33. The method of claim 31 further comprising modifying another routine in the first instance of the software module to jump to another routine in the patch when executed.

* * * * *